United States Patent
Mareno et al.

[11] Patent Number: 5,935,729
[45] Date of Patent: Aug. 10, 1999

[54] CAM ACTUATED LATCH FOR BATTERY CASE

[75] Inventors: Jason Mareno; Tom Snyder, both of Raleigh, N.C.

[73] Assignee: Ericsson, Inc., Research Triangle Park, N.C.

[21] Appl. No.: 08/928,322

[22] Filed: Sep. 12, 1997

[51] Int. Cl.[6] .............................. H01M 2/10; E05C 1/12
[52] U.S. Cl. .......................... 429/100; 429/99; 292/159; 292/170
[58] Field of Search ............................... 429/100, 99, 97; 292/159, 170, 157, DIG. 37; 206/703, 705

[56] References Cited

U.S. PATENT DOCUMENTS

5,607,792  3/1997  Garcia et al. .............................. 429/97

*Primary Examiner*—John S. Maples
*Attorney, Agent, or Firm*—Rhodes, Coats & Bennett, LLP

[57] ABSTRACT

A battery pack for an electronic device including a latch assembly comprising a latching member, a biasing member, and an actuator. The latching member is movable between an extended position and a retracted position. The biasing member urges the latching member to the extended position so that when the battery pack is mounted to the electronic device, the latching member prevents its removal. To remove the battery pack, an actuator is provided to engage the latching member and push it downwardly to a retracted position. During assembly of the battery pack, the latching member can be pushed down to a retracted position allowing the actuator to move to an assembly position. In this position, the actuator is engaged by a retaining member on the battery case to hold the latching member and actuator in place during assembly.

20 Claims, 8 Drawing Sheets

CAM ACTUATED LATCH FOR BATTERY CASE

FIELD OF THE INVENTION

The present invention relates generally to removable battery packs for electronic devices, and more particularly, to a latch mechanism for a battery pack.

BACKGROUND

Portable electronic devices, such as cellular phones, laptop computers, and other consumer products typically include a replaceable and rechargeable battery pack. When one battery pack is depleted, it can be removed and replaced with another fully charged battery pack while the depleted battery pack is recharged. A battery pack typically includes a sealed enclosure which contains rechargeable batteries. Contacts on the exterior surface of the battery pack mate with contacts on the electronic device when the battery pack is mounted to the electronic device. Battery packs typically have exterior surfaces which blend with the contours of the electronic device in an aesthetically pleasing way and latch mechanisms which are relatively unobtrusive but easy to use.

There are many types of latching mechanisms for use in battery packs. One of the most common types of mechanisms is a simple plastic cantilever latch. This type of latch comprises a cantilever or beam which is anchored at one end and carries a latch element at the opposite end. The cantilever or beam is deflected in order to engage or disengage the latch. In general, long cantilevers are preferred over short cantilevers for several reasons. First, longer cantilevers allow for greater deflection which in turn allows for greater latch engagement. Moreover, in order to make the plastic cantilevers strong, it is often necessary to make them thick. Thick cantilevers require greater effort than thin beams to deflect. If low efforts are desired, then the cantilever must be made thinner or longer. It is difficult to design long cantilevers into the product, and thin cantilevers are weak.

An alternative to cantilever latches, are spring-loaded cam latches. In this type of latch, a metal leaf spring or coil spring is used to urge a latch member to an engaged position. The latch member often includes a camming surface which is engaged by an actuator element to move the latch member to a disengaged position. Spring-loaded latches have several advantages over cantilever latches. The metal springs provide a smoother, almost constant latch effort. It is easier to design latch mechanisms with the desired latch force, travel and feel without the trade-offs of cantilever latches. The space requirements for spring-loaded latching mechanisms is often less than cantilever latches, which is important as electronic devices become smaller and more portable.

Despite the many advantages of spring-loaded latching devices, there are difficulties with this design as well. The primary drawback with spring-loaded latch mechanisms is that they are typically difficult and usually more costly to assemble. The springs must be held in a loaded condition during assembly. Often times, the size or placement of the springs make them difficult to handle and place properly. Also, it is difficult to hold the components in a stationary position during assembly because of the components are designed for relative movement with respect to one another. These problems make assembly of spring-loaded latch mechanisms more difficult and more costly.

Accordingly, there is a need for a small, unobtrusive latch mechanism which is reliable and easy to activate while still being cost effective and easy to manufacture.

SUMMARY OF THE INVENTION

The present invention is a spring-loaded latch mechanism for a battery case which is reliable and easy to operate and yet simple to assemble. The battery pack includes a case which contains batteries for powering an electronic device. The case includes a base portion and a lid. A latch mechanism is contained within the case for securing the battery pack to the electronic device.

The latch mechanism includes a latching member which is movable between an extended position and a retracted position. The latching member includes at least one latching element which projects through an opening in the housing when the latching member is in the extended position to prevent removal of the battery pack from the electronic device. To remove the battery pack, an actuator is provided to engage the latching member and push it downwardly to a retracted position. In normal use, the actuator moves between a home position and a release position. When the actuator is moved to the release position, it engages the latching member and pushes it downwardly to a retracted position so that the battery pack can be removed from the electronic device. When the actuator is released, springs urge the latching member back to the extended position which in turn causes the actuator to return to the home position.

Due to the spring load on the latching member, the latching member and actuator must be constrained against movement during assembly of the battery pack. For this purpose, the base portion of the housing includes a retaining finger piece. During assembly, the latching member is pushed downward to a retracted position and held while the actuator is inserted. While holding the latching member down, the actuator is moved to an assembly position. In this position, the actuator is trapped beneath the retaining finger on the battery case, thereby holding the latch components in place without support from the lid. After the lid is assembled to the base portion, the actuator is moved back to the home position and the latching member is forced back to the extended position by the springs.

DETAILED DESCRIPTION OF THE INVENTION

Referring now to the drawings, there is shown a battery pack 10 for an electronic device (not shown). The battery pack 10 comprises an case 12 which contains rechargeable batteries 14. The batteries 14 are electrically connected to contacts (not shown) on the exterior of the case 12 which mate with corresponding contacts on the electronic device to supply power to the electronic device. The battery pack 10 is designed to be releasably mounted to the electronic device. A latch mechanism 60 secures the battery pack 10 to the electronic device to prevent its removal.

The case 12 includes a base portion 20 and a lid 50. The base portion 20, shown in FIG. 3, has a bottom wall 22, a front wall 24, a back wall 26, and a pair of end walls 28. The bottom wall 22, front wall 24, back wall 26, and end walls 28 are preferably molded as a single unit from a hard, impact resistant, plastic material. The lid 50 is molded separately, preferably from the same material, and subsequently joined with the base portion 20 of the case 12 by any suitable means such as ultrasonic welding.

Figure 3:
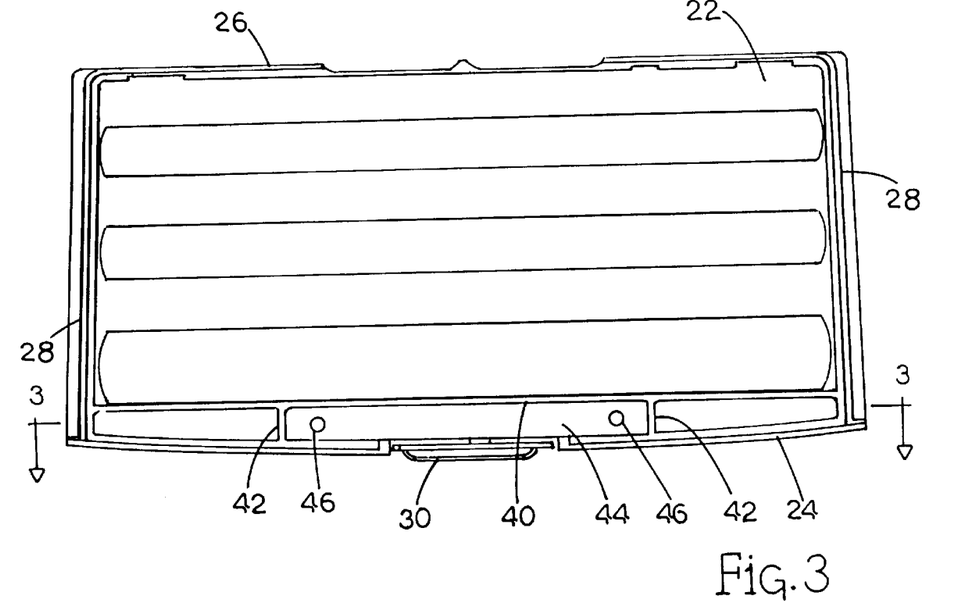
FIG. 3 is a top plan view of the base portion of the battery case.

A latch cavity 44 is formed on the interior of the base portion 20 adjacent to the front wall. The latch cavity 44 is bounded by a partition wall 40, two small dividing walls 42, and the front wall 24 of the base portion 20. The partition wall 40 extends lengthwise between the end walls 28. The dividing walls 42 extend perpendicularly from the partition wall 40 to the front wall 24. The latch cavity 44 is preferably located approximately midway between the end walls 28. A pair of guide posts 46 extend upward from the bottom of the latch cavity 44. The purpose of the latch cavity 44 is to hold the latch components.

Figure 4:
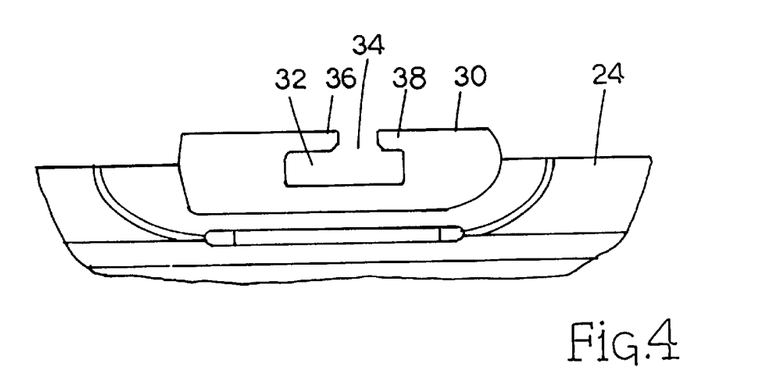
FIG. 4 is a detail showing the locking plate on the battery case.
Figure 5:
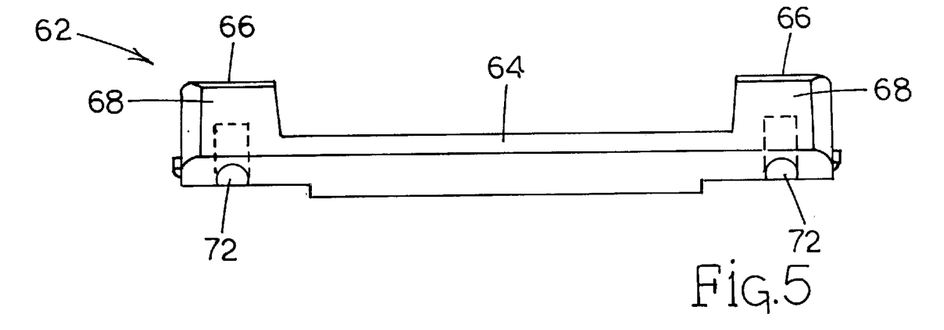
FIG. 5 is a front elevation view of the latching element.
Figure 6:
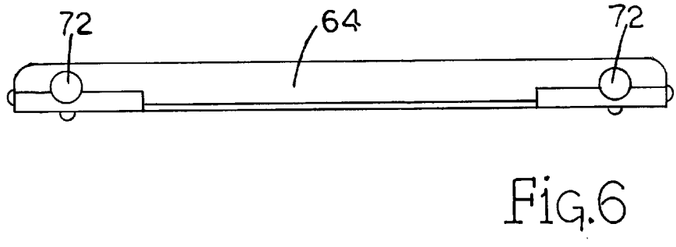
FIG. 6 is a bottom view of the latching element.
Figure 7:
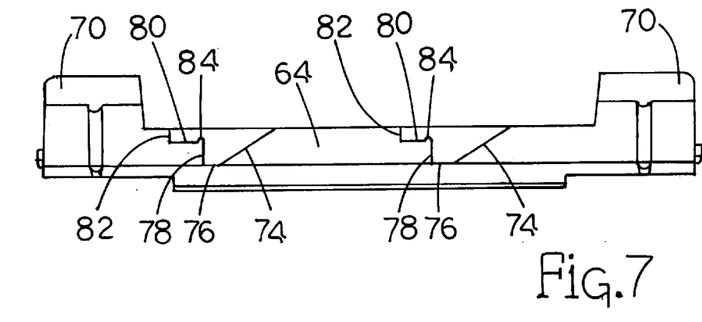
FIG. 7 is rear elevation view of the latching element mirrored left to right for clarity.
Figure 8:
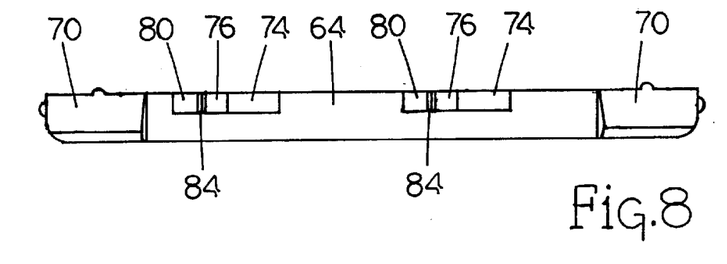
FIG. 8 is a top plan view of the latching element.
Figure 9:
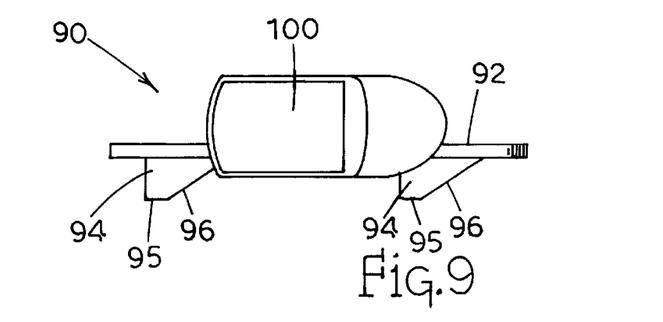
FIG. 9 is a front elevation view of the actuator element.
Figure 10:
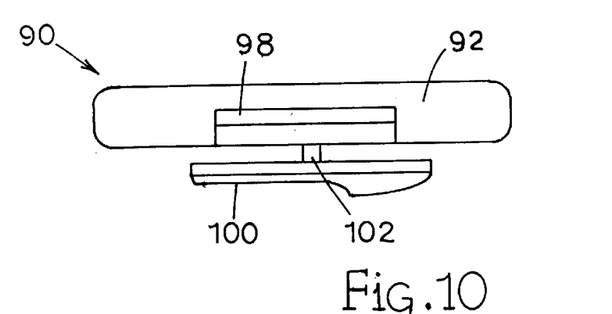
FIG. 10 is a top plan view of the actuator element.
Figure 11:
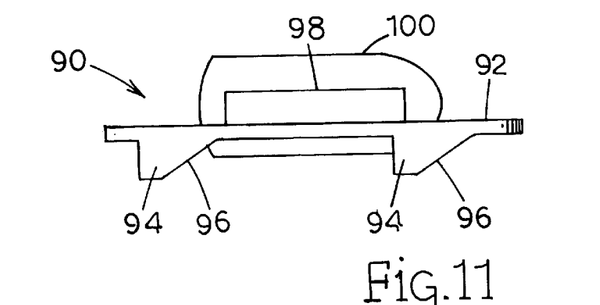
FIG. 11 is a rear elevation view of the actuator element, mirrored left to right for clarity.
Figure 12:
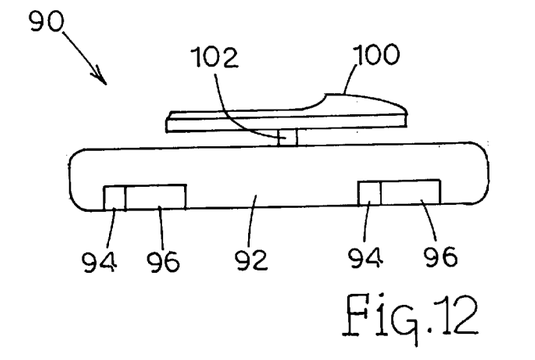
FIG. 12 is a bottom view of the actuator element.
Figure 13:
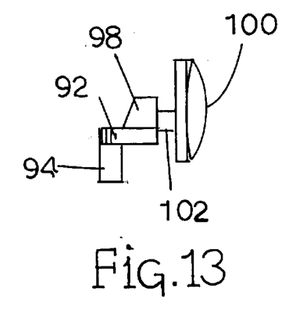
FIG. 13 is an end view of the actuator element.

As shown in FIG. 3 and FIG. 4, the front wall 24 of the base portion 20 includes a locking plate 30 which is disposed adjacent to the latch cavity 44. The locking plate 30 includes a slot 32 for an actuator 90 which will be described in detail below. An entry opening 34 extends from the slot 32 to the top edge of the locking plate 30 to allow insertion of the actuator 90 into the slot 32. The portion of the locking plate 30 above the slot 32 forms two fingers 36 and 38. The opening 34 is disposed slightly forward of the center of the slot 32 so that the rear finger 36 is longer than the forward finger 38. As will be described below, the rear finger 36 functions as a retaining member during assembly of the battery pack 10 which holds the latch components in place until the lid 50 is assembled to the base portion 20.

Figure 2:
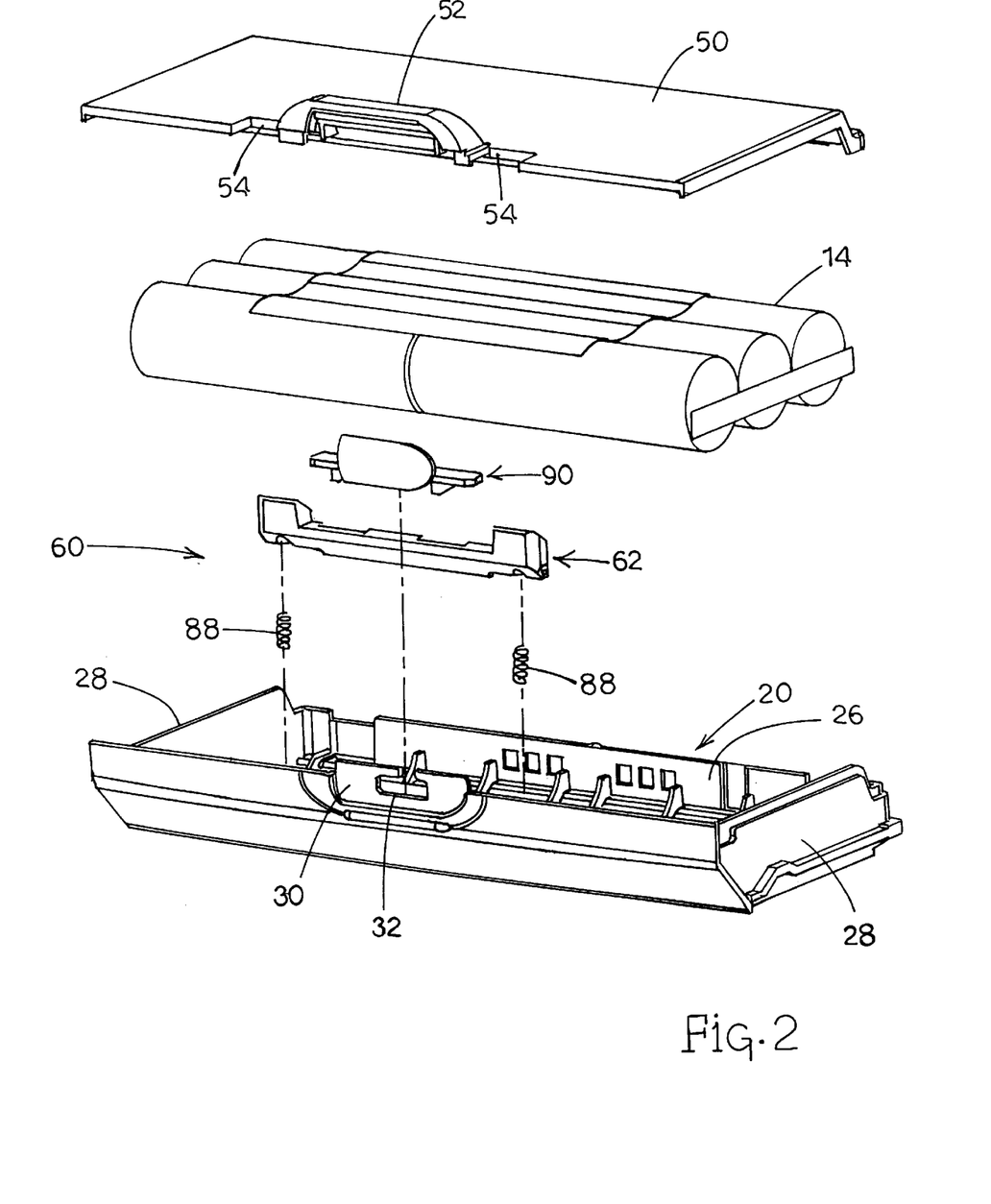
FIG. 2 is an exploded perspective view of the battery pack.

Referring to FIG. 2, the lid 50, as described above, is joined with the base portion 20 of the case 12 to form a sealed enclosure for the batteries 14. A hood 52 is formed along the forward edge of the lid 50 to provide room for the latch components. The hood 52 is shaped to match the locking plate 30 on the base portion 20 which also projects above the surface of the lid 52. A pair of retention flanges 53 extend downwardly from underneath the hood 52, A pair of latch openings 54 are disposed on opposite sides of the hood 52. The latch elements 66 project through these openings 54.

Referring now to FIGS. 5–18, the latch mechanism 60 is shown in more detail. The latch mechanism 60 includes a latching member 62, an actuator 90, and two coil springs 88. The latch member 60 is disposed within the latch cavity 44 and is pushed upwardly to an extended or engaged position by the coil springs 88. Latch elements 66 on the latching member 62 project up through the latch openings 54 in the lid 30 when the latching member 62 is in the engaged position. The actuator 90 is disposed above the latch element 62 and projects through the slot 32 of the locking plate 30. In normal operation, the actuator 90 moves forward and rearward in the slot 32 between a home position and a release position. The actuator 90 includes a camming member 94, and preferably a pair thereof, which engages the latching member 62 when it is moved from the home position to the release position. When the actuator 90 is moved to the release position, it engages the latching member 62 and pushes it down to a retracted or disengaged position so that the battery pack 10 can be removed from the electronic device.

Referring now to FIGS. 5–8, the latching member 62 is shown in greater detail. The latching member 62 comprises an elongated member 64 having latching elements 66 disposed at each end thereof. The latching elements 66 extend upwardly from a top surface of the elongated member 64. The latching elements 66 include a generally flat latching surface 68 and an inclined camming surface 70. The latching surface 68 faces towards the front of the battery pack 10 and the camming surface 70 faces towards the rear of the battery pack 10. Spring holes 72 are formed in the underside of the elongated member 64 and extend upwardly into the latching elements 66.

The latching member 62 includes two camming surfaces 74 which are disposed between the latch elements 66. The camming surfaces 74 extend downward from the top surface of the elongated member 64. As will be described below, the camming surfaces 74 are engaged by the actuator 90 during operation of the latching mechanism 60 to urge the latching member 64 to a retracted or disengaged position. A flat land 76 is disposed at the bottom of each camming surface 74. A wall 78 extends vertically from the lower land 76 to an upper land 80. The upper land 80 is disposed above the lower land 76 but below the top surface of the elongated member 64. The function of the upper land 80 is to provide a surface for engagement by the actuator 90 when the actuator 90 is in an assembly position as will be described below. Another wall 82 extends vertically from the upper land 80 to the top surface of the elongated member 64.

Referring now to FIGS. 9–13, the actuator 90 is shown in detail. The actuator 90 comprises a cam plate 92, a pair of camming members 94, and a thumb pad 100. The camming members 94 extend downward from the underside of the camming plate 92 to engage the latching member 62. Each camming member 94 includes a camming surface 96, a bottom surface 95, and a rear surface 97. The camming surface 96 of each camming member 94 engages a corresponding camming surface 74 on the latching member 62. A mounting block 98 is attached to the upper surface of the camming plate 92. The thumb pad 100 is connected to a mounting block 98 by a connecting member 102 which passes through the slot 32 in the locking plate 30. Thus, the thumb pad 100 is disposed on the exterior of the case 12 where it can be easily manipulated by the user.

The function of the actuator 90 is to engage the latching member 64 and move it to a retracted position to allow removal of the battery pack 10 from an electronic device. In the disclosed embodiment, the actuator 90 is movable horizontally between a home position and a release position during normal operation. When the actuator is in the home position, the latching member 62 is urged upward to the engaged position by the springs 88. When the actuator 90 is moved to the release position, the camming surfaces 96 act against the camming surfaces 76 on the latching member 62 to urge the latching member 62 to a retracted position.

The springs 88, as previously alluded to, are positioned between the bottom 22 of the base portion 20 and the latching member 62 so as to urge the latching member 62 to the engaged position. One end of each spring 88 fits over a respective guide post 46 in the latch cavity 44. The opposite end of the spring 88 extends up into the spring hole 72 in the latching member 62. While coil springs 88 are used in the disclosed embodiment, those skilled in the art will recognize that other types of springs, plastic cantilevers, or elastic members can also be used to bias the latching member 62. The particular type of biasing member chosen is therefore not a critical aspect of the invention.

Figure 14:
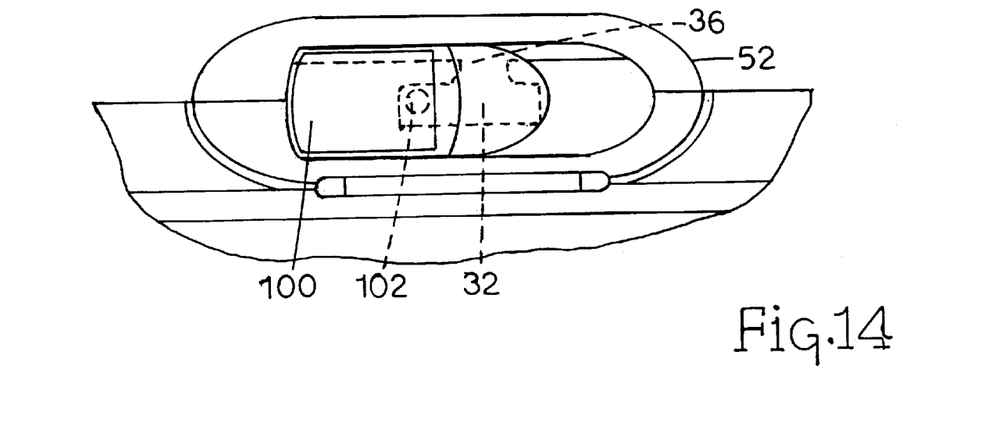
FIG. 14 is a partial front elevation view of the battery pack showing the actuator in the assembly position.
Figure 15:
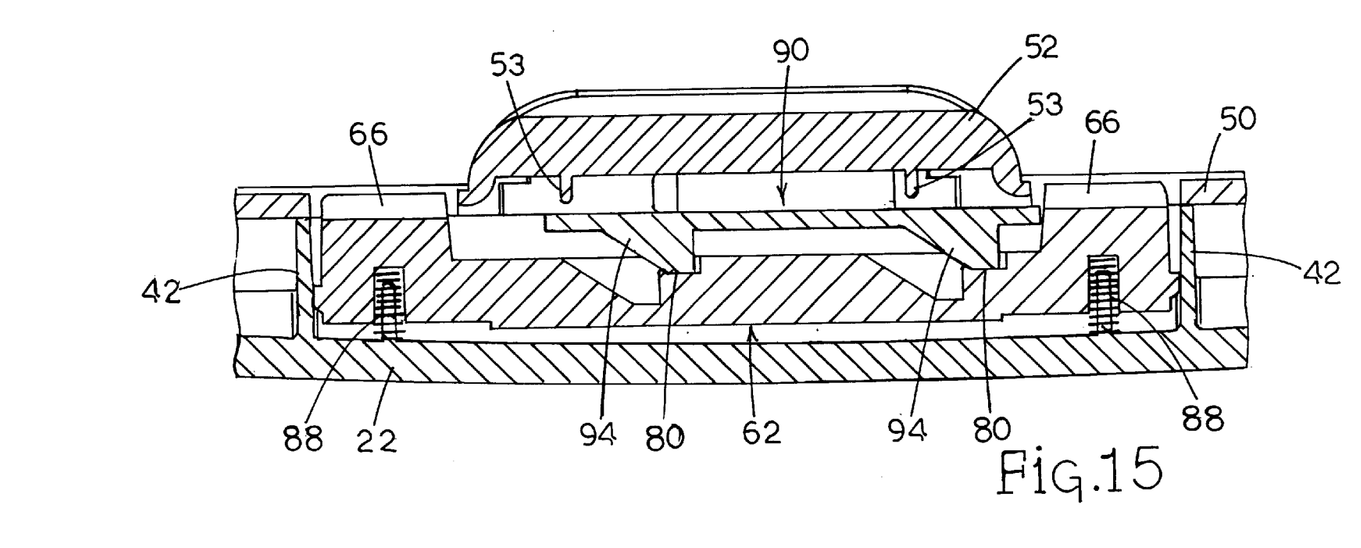
FIG. 15 is a section view of the latching assembly taken through line 3—3 of FIG. 3 showing the actuator in the assembly position.
Figures 16, 17:
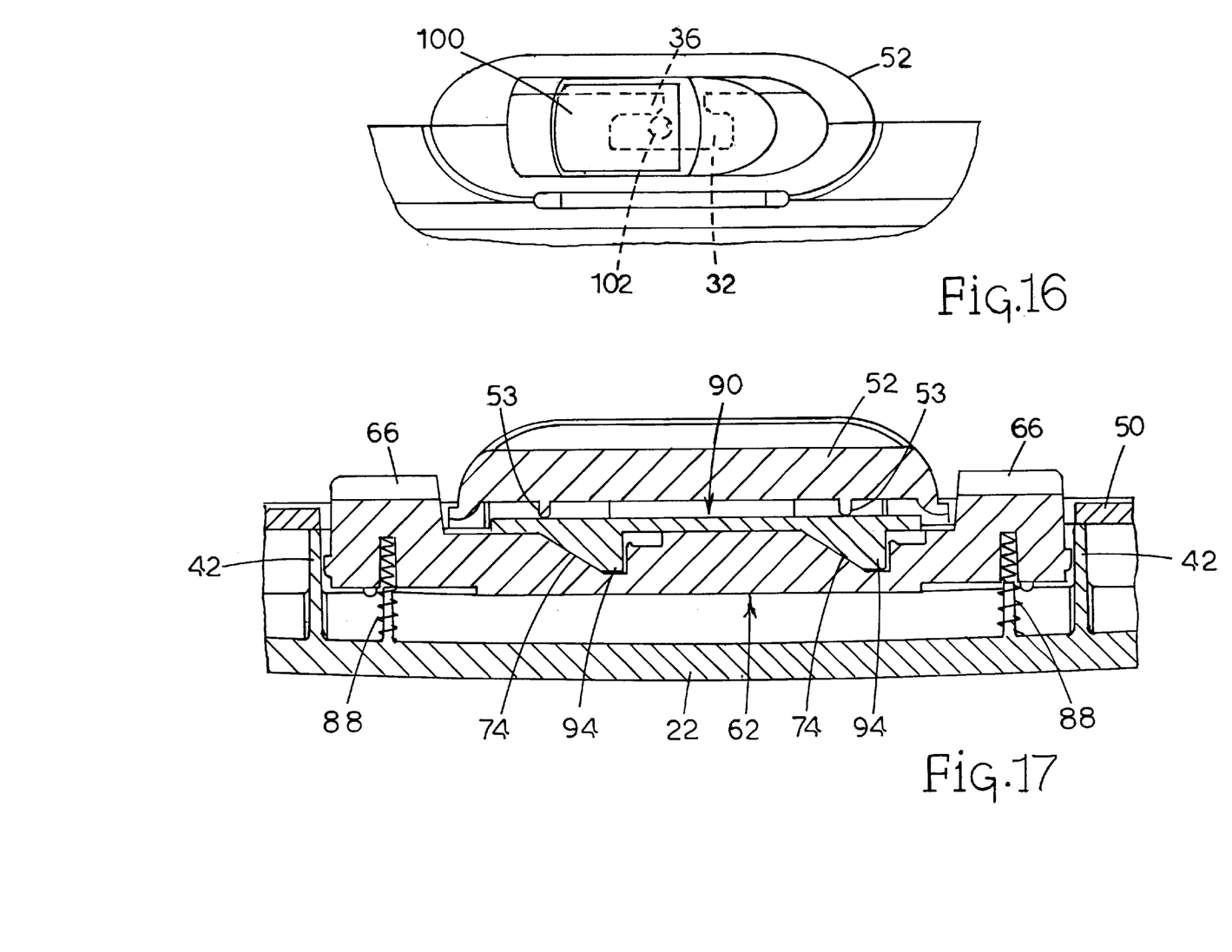
FIG. 16 is a partial front elevation view of the latching assembly showing the actuator in the home position.
FIG. 17 is a section view of the latching assembly taken through line 3—3 of FIG. 3 showing the actuator shown in the home position.
Figure 18:
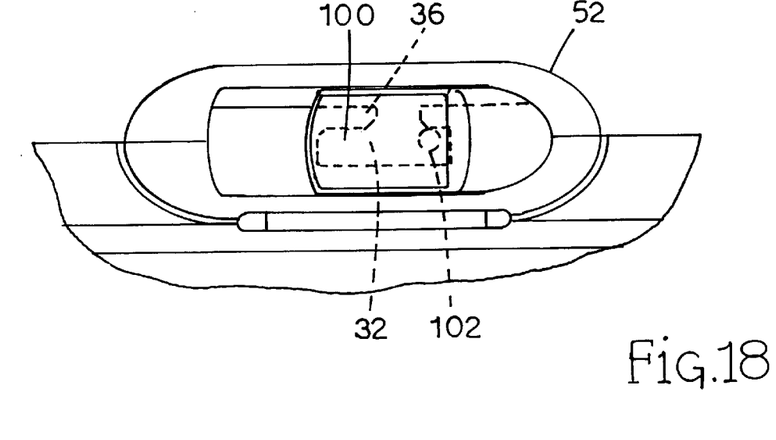
FIG. 18 is a partial front elevation view of the latching assembly showing the actuator in the release position.
Figure 19:
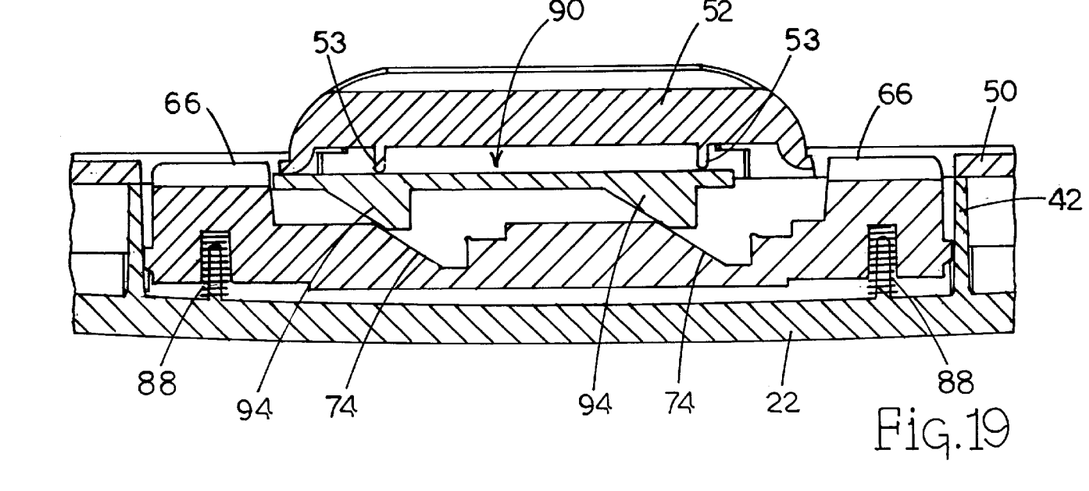
FIG. 19 is a section view of the latching assembly taken through line 3—3 of FIG. 3 showing the actuator in the release position.

Referring now to FIGS. 14–19, the operation of the latch mechanism 606 will be described. FIGS. 14 and 15 illustrate the latching mechanism in an assembly position. FIGS. 16 and 17 illustrate the latching mechanism in an engaged or latched position. FIGS. 18 and 19 illustrate the latching mechanism in a disengaged or release position To assemble the battery pack 10, the latching element 62 and springs 88 are first placed within the latching cavity 44. One end of the each spring 88 is inserted over a respective guide post 46 in the latching cavity 44 and the opposite end of the spring 88 is inserted into the corresponding spring hole 72 in the base of the latching member 62. The latching member 62 is then pressed downward and held. While holding the latching member 62 down, the connecting member 102 of the actuator 90 is inserted into the slot 32 of the locking plate 30 through opening 34. The actuator 90 is then moved to the left as shown in FIG. 14 (or to the right as shown in FIG. 15) into an assembly position. When this is done, the connecting member 102 of the actuator 90 is trapped beneath the finger 36 of the locking plate 30 as shown in FIG. 14. Thus, the finger 36 physically constrains the latching member 62 and actuator 90 against vertical movement. In the assembly position, the bottom surfaces 95 on the camming members 94 engage the upper lands 80 on the latching member 62 to hold the latching member 62 in a retracted position with the spring 88 compressed as shown in FIG. 15. Ridges 84 located along the edge of the lands 80 prevent the actuator 90 from slipping off the lands 80. With the latching member 62 held down, the lid 50 is assembled to the base portion 20 of the case 12.

With the actuator in the assembly position, the retention flanges 53 of the lid 50 do not contact the actuator 90 (see FIG. 15). Further, the latching member 62 is held in a retracted position away from the interface between the lid 50 and the base portion 20. This spacing away from the lid 50 greatly facilitates the use of ultrasonic welding to join the lid 50 and the base portion 20. Because the latching components are held away from the weld site, the latching components are less likely to become fused, thereby reducing assembly problems and producing a higher quality product.

Once the lid 50 is assembled to the base portion 20 of the case 12, the actuator 90 is moved to the right as shown in FIG. 16 (or to the left as shown in FIG. 17). As the actuator 90 is moved to the right, the springs 88 push the latching member 62 upward to an extended or engaged position as shown in FIG. 17. In this position, the camming surface 96 on the camming member 94 contacts the camming surface 96 on the latching member 62. This position is referred to as the home position for the actuator 90. It should also be noted that once the actuator 90 is placed in this home position, it is prevented from moving back to the assembly position. The rear wall 97 of the camming member 94 engages the vertical wall 78 which acts as a stop.

Figure 1:
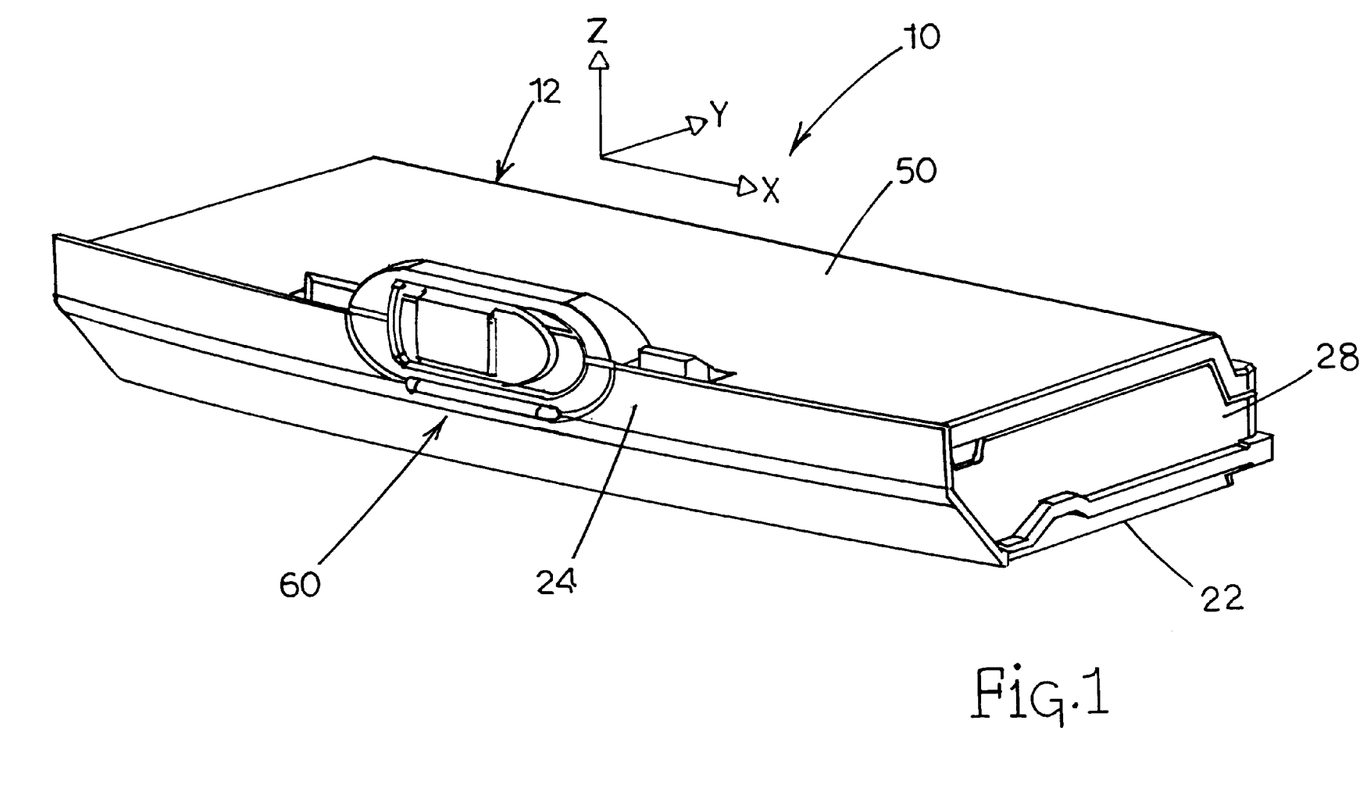
FIG. 1 is a perspective view of a battery pack incorporating the spring-loaded latch mechanism of the present invention.

In use, the battery pack 10 is attached to the electronic device by sliding it along the y-axis as shown in FIG. 1. As the battery pack 10 is inserted, the latching member 62 is cammed downward along the z-axis by contact of the inclined camming surface 70 with some structure on the electronic device. When the battery pack 10 is completely inserted, the latching member 62 is pushed back upward by the springs 88 to the extended or engaged position. The latching elements 66 latch behind structural elements on the electronic device. When engaged behind these structural elements, the latching member 62 prevents the battery pack 10 from sliding back outward along the y-axis. Positive stop features stop the battery pack 10 at the proper insertion depth. In the disclosed embodiment, the stop feature is the back wall 26 of the case 12. Guide rails disposed on each end walls 28 constrain the battery pack 10 in the x and z directions.

Removal of the battery pack 10 from the electronic device is achieved by sliding the actuator 90 forward (to the right) along the x-axis as shown in FIG. 18 (or to the left as shown in FIG. 19). As the actuator 90 slides forward, the latching member 62 is cammed downwardly to a retracted or disengaged position as shown in FIG. 19. With the latching member 62 held down by the actuator 90, the battery pack 10 is free to slide out of its slot in the electronic device. When the actuator 90 is released by the user, the spring force acting on the latching member 62 drives the latching member 62 back upward to an engaged position and forces the actuator 90 back to its home position in the process.

Once in the home position, the actuator 90 is constrained to move in essentially a horizontal direction by the interaction of the retention flanges 53 and the camming plate 92 of the actuator 90. The pair of retention flanges 53 provide a stop against which the actuator 90 is pushed vertically by the springs 88, but do not limit the lateral motion of the actuator 90. In this manner, the retention flanges 53 help prevent the actuator 90 from rattling. In an alternative embodiment, the actuator may be constrained by the interaction of the thumb pad 100 and the hood 52.

From the foregoing, it is apparent that the latching mechanism 60 of the present invention overcomes some of the problems previously encountered in the assembly of springloaded latching mechanisms by providing structure to constrain the latch components during assembly thereof. Thus, the present invention allows for assembly without the need for complicated fixtures or procedures to hold the components during assembly. Another advantage is that the present invention holds the latch components away from the joints in the case 12 so that ultrasonic welding can be used to attach the lid 50 without fusing the latch components.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A battery pack for an electronic device comprising:
   a) a housing including a base member and a cover assembled together for containing batteries to power said electronic device;
   b) a latch assembly contained within said housing including:
      i) a latching member movable between extended and positions;
      ii) a biasing member urging said latching member to said extended position;
      iii) an actuator normally disposed in a home position and movable to a release position, wherein said actuator urges the latch member to said retracted position when said actuator is moved to said release position; and
   c) a retaining member on said base member of said housing for retaining said latching member and said actuator within said base member before said cover is assembled to said base member.

2. The battery pack according to claim 1 wherein said actuator is movable to an assembly position before said cover is assembled to said base member and wherein said actuator engages and holds said latching member in said retracted position when said actuator is in the assembly position.

3. The battery pack according to claim 2 wherein said retaining member engages said actuator while said actuator is in the assembly position.

4. The battery pack according to claim 3 wherein said latching member includes a camming surface and said actuator includes a camming member which engages said camming surface on said latching member to urge said latching member to a retracted position when said actuator is moved to a release position.

5. The battery pack according to claim 4 wherein said latching member includes a land which is engaged by said actuator when said actuator is in the assembly position, and wherein said camming member holds said latching member in the retracted position when said camming member is in contact with said land.

6. The battery pack according to claim 5 further including a stop to prevent said actuator from moving to the assembly position once said actuator assumes the home position.

7. The battery pack according to claim 1 wherein said retaining member comprises a locking plate on said housing with a slot therein to receive said actuator, said actuator being movable within said slot in said locking plate.

8. The battery pack according to 7 wherein said locking plate includes an opening for inserting said actuator into said slot in said locking plate.

9. A battery pack for an electronic device comprising:
   a) a housing for containing batteries to power said electronic device;
   b) a latching member contained within said housing, said latching member being moveable between an engaged position and a disengaged position;
   c) a biasing member urging said latching member to said engaged position;
   d) an actuator normally disposed in a home position and movable to the home position from an assembly position and movable between the home position and a release position; said actuator including a camming member for engaging said latching member and urging it to a retracted position when said actuator is moved to the release position;
   e) a retaining member disposed in said housing to engage said actuator when the actuator is in the assembly position, wherein in said assembly position the actuator engages and holds the latching member in a retracted position.

10. The battery pack according to claim 9 wherein said latching member includes a camming surface which is engaged by said camming member on said actuator.

11. The battery pack according to claim 10 wherein said latching member further includes a land disposed adjacent said camming surface which is engaged by said camming member on said actuator when said actuator is in the assembly position, and wherein said camming member holds said latching member in a retracted position when the camming member is in contact with said land.

12. The battery pack according to claim 11 wherein said latching member further includes a stop to prevent the actuator from moving to the assembly position once said actuator is in the home position.

13. The battery pack according to claim 9 wherein said retaining member comprises a locking plate on said housing with a slot therein to receive said actuator, said actuator being movable within said slot in said locking plate.

14. The battery pack according to 13 wherein said locking plate includes an opening for inserting said actuator into said slot in said locking plate.

15. A latch mechanism comprising:
   a) a latching member having at least one latching element, said latching member being moveable between an engaged position and a disengaged position;
   b) a biasing member urging said latching member to said engaged position;
   c) an actuator normally disposed in a home position and movable to the home position from an assembly position and movable between the home position and a release position; said actuator including a camming member for engaging said latching member and urging it to a retracted position when said actuator is moved to the release position;
   d) a retaining member to engage said actuator when the actuator is in the assembly position, wherein in said assembly position the actuator engages and holds the latching member in a retracted position.

16. The latch mechanism according to claim 15 wherein said latching member includes a camming surface which is engaged by said camming member on said actuator.

17. The latch mechanism according to claim 16 wherein said latching member further includes a land disposed adjacent said camming surface which is engaged by said camming member on said actuator when said actuator is in the assembly position, and wherein said camming member holds said latching member in a retracted position when the camming member is in contact with said land.

18. The latch mechanism according to claim 17 wherein said latching member further includes a stop to prevent the actuator from moving to the assembly position once said actuator is in the home position.

19. The latch mechanism according to claim 15 wherein said retaining member comprises a locking plate on said housing with a slot therein to receive said actuator, said actuator being movable within said slot in said locking plate.

20. The latch mechanism according to 19 wherein said locking plate includes an opening for inserting said actuator into said slot in said locking plate.

* * * * *